(12) United States Patent
Nzudie et al.

(10) Patent No.: US 6,225,395 B1
(45) Date of Patent: May 1, 2001

(54) AQUEOUS STABLE DISPERSIONS BASED ON WATER-SOLUBLE POLYMERS CONTAINING A CATIONIC DISPERSANT COMPRISING HYDROPHOBIC UNITS

(75) Inventors: Denis Tembou Nzudie, Serquigny; Christian Collette, Paris, both of (FR)

(73) Assignee: Elf Atochem, S.A., Puteaux (FR)

( * ) Notice: Subject to any disclaimer, the term of this patent is extended or adjusted under 35 U.S.C. 154(b) by 0 days.

(21) Appl. No.: 09/182,651

(22) Filed: Oct. 30, 1998

(30) Foreign Application Priority Data

Nov. 4, 1997 (FR) .................................................. 97 13859

(51) Int. Cl.⁷ ..................................................... C08F 2/28
(52) U.S. Cl. ......................... 524/458; 524/460; 524/521; 524/551; 524/552; 524/555; 524/812; 524/815
(58) Field of Search ..................................... 524/458, 460, 524/521, 551, 552, 555, 812, 815

(56) References Cited

U.S. PATENT DOCUMENTS

| | | |
|---|---|---|
| 183,466 | 10/1876 | Pearl . |
| 4,929,655 | 5/1990 | Takeda et al. . |
| 5,006,590 | 4/1991 | Takeda et al. . |
| 5,403,833 | 4/1995 | Calne . |
| 5,587,415 | 12/1996 | Takeda . |
| 5,597,858 | 1/1997 | Ramesh et al. . |

FOREIGN PATENT DOCUMENTS

| | | | |
|---|---|---|---|
| 2123460 | 5/1994 | (CA) . | |
| 2143564 | 2/1995 | (CA) | ........................................ 2/20 |
| 525751 | 7/1991 | (EP) . | |
| 637598 | 6/1994 | (EP) . | |
| 657478 | 6/1995 | (EP) . | |
| 670333 | 9/1995 | (EP) . | |

OTHER PUBLICATIONS

European Search Report dated May 22, 1998.

Primary Examiner—Duc Truong
(74) Attorney, Agent, or Firm—Smith, Gambrell & Russell, LLP

(57) ABSTRACT

Water-in-water dispersions based on water-soluble polymers can be prepared using a polymer dispersant containing hydrophobic units. The dispersions of the invention are stable on storage and are of low viscosity.

9 Claims, No Drawings

AQUEOUS STABLE DISPERSIONS BASED ON WATER-SOLUBLE POLYMERS CONTAINING A CATIONIC DISPERSANT COMPRISING HYDROPHOBIC UNITS

FIELD OF THE INVENTION

The present invention relates to novel dispersants based on cationic polymers comprising hydrophobic units, which make it possible, by means of water-in-water emulsion polymerization, to obtain dispersions of water-soluble polymers of low viscosity and with a high concentration of water-soluble polymers.

BACKGROUND OF THE INVENTION

Water-soluble polymers are used for various applications and, in particular, as flocculants for processing industrial and urban waste water, dehydration of the sludges generated, as a thickener and as a treating agent for floors. Aqueous systems of such water-soluble polymers with a high solids content are in the form of a gel and have very high viscosities, which make them difficult to handle and store. The problem with which a person skilled in the art is faced is to produce such aqueous systems but which have both a high solids content and low viscosity.

Conventional processes for synthesizing these polymers comprise solution, reverse-suspension and reverse-emulsion polymerization. Solution and reverse-suspension polymerization lead to products in powder form which have the drawback of generating dust at the time of use, of dissolving poorly in water and of not being able to form aqueous solutions of polymers in high concentration which can be handled easily. Besides this inconvenient implementation which is intrinsic to the pulverulent form of the product, these two processes are handicapped in terms of production efficiency, on the one hand on account of the low monomer concentration used during polymerization, and on the other hand on account of a drying and/or grinding step leading to an increase in the cycle time and excessive energy consumption costs. As regards the reverse-emulsion polymerization process, this leads to a product containing a pollutant organic solvent and having unsatisfactory stability.

To overcome these drawbacks, a novel polymerization technique has been developed leading to aqueous dispersions of water-soluble polymers, the originality of which process lies in the presentation plan, i.e. they are free of pollutant solvent, do not generate any dust, are rapidly water-soluble, are of low viscosity, have a high polymer content, and are ready to use. However, this technique requires suitable polymer dispersants.

Certain authors have prepared cationic, amphoteric or nonionic water-soluble polymers by polymerization of water-soluble monomers in the presence of a polymer dispersant of low mass. EP 170 394 describes a dispersion of polymer gel particles which are greater than 20 μm in size in a solution of poly(sodium acrylate) or poly (diallyldimethylammonium chloride) (poly(DADMAC)) as dispersant. However, this product has the drawback of having an increase in viscosity after a long period of storage. This viscosity can only be reduced after shear or stirring.

U.S. Pat. No. 183,466, EP 525,751 A1, U.S. Pat. No. 4,929,655, U.S. Pat. No. 5,006,590 and EP 657,478 A2 propose the case of precipitation-polymerization in saline medium of water-soluble monomers, the polymer of which precipitates in particle form and is then dispersed by means of stirring and stabilized by polymer dispersants of low mass, which are themselves soluble in saline medium.

Documents DE 4,216,167A1 and U.S. Pat. No. 5,403,883 describe a technique for obtaining salt-free dispersions, of low viscosity by polymerization in the presence of the dispersant poly(DADMAC), of a mixture of hydrophilic, hydrophobic and optionally amphiphilic monomers. On the same basis, EP 0,670,333 describes dispersions of polymers crosslinked by adding a crosslinking agent such as N-methylolacrylamide or N,N-methylenebisacrylamide to the mixture of monomers to be polymerized. Post-addition of the same dispersant allows a decrease in the viscosity of the systems described above (CA 3,123,460). However, the effect of his is to increase the level of dispersant and to lead to a dispersion having a low level of dispersed polymer.

The prior art shows that the viability of a process for the synthesis of a dispersion of water-soluble polymers is based on the production of a salt-free product of low viscosity having a high level of dispersed polymer which must be of high mass, and a low level of dispersant which must be of low mass, while at the same time giving good performance levels in the final application.

DESCRIPTION OF THE INVENTION

Applicant has now found that salt-free dispersions of water-soluble polymers can be prepared with improved properties, namely low viscosity and a high solids content, by using dispersants based on cationic, amphoteric or nonionic polymers comprising hydrophobic units.

It is preferable for the dispersant to contain cationic units so as to be able to play a role in the following applications: flocculant, paper retention, agent which facilitates cleaning soiling on various supports (for example textile), dispersion of charges, inhibition agent for the transfer of pigments and dyes onto various supports such as textile, thickener.

A first subject of the invention is polymer dispersants containing hydrophobic units.

The dispersants according to the invention are polymers containing residues of:

a) from 15 to 99 mol %, and preferably from 20 to 80 mol %, of at least one water-soluble monomer A which may be:
a monomer A1 corresponding to the following general formulae:

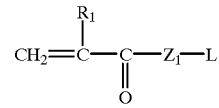

in which
$R_1$=H or $CH_3$,
$Z_1$=O, NH or $NR_2$ with $R_2$ being a $C_1$–$C_6$ alkyl or hydroxyalkyl group

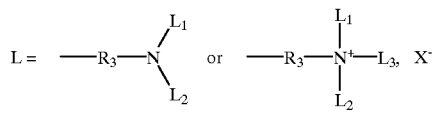

where $R_3$=$C_1$–$C_6$ alkylene or hydroxyalkylene and $L_1$, $L_2$ and $L_3$ independently represent an H, a $C_1$–$C_6$ alkyl or hydroxyalkyl, a $C_5$–$C_{12}$ cycloalkyl or a $C_6$–$C_{12}$ aryl or alkylaryl, X is a monovalent ion such as Cl, SNC, etc.,

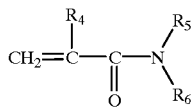

in which $R_4$=H or a methyl, $R_5$ and $R_6$ independently represent an H, a $C_1$–$C_6$ alkyl or hydroxyalkyl or a $C_5$–$C_{12}$ cycloalkyl, the monomers containing carboxylic acid functions and their derivatives such as methacrylic acid, acrylic acid and their salts, the monomers containing quaternary ammonium functions such as diallyl dimethylammonium chloride, denoted by DADMAC, or imidized and salified maleic anhydride, any other water-soluble monomer different from those mentioned above, which can be emulsion-polymerized via a radical route, b) from 1 to 85 mol %, and preferably from 20 to 80 mol %, of at least one hydrophobic monomer B chosen from the group containing the monomers B1 corresponding to the following formula:

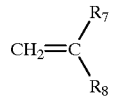

in which $R_7$ represents an H or a $C_1$–$C_{12}$ alkyl or a $C_5$–$C_{12}$ cycloalkyl or a $C_6$–$C_{12}$ aryl or a $C_8$–$C_{32}$ arylalkyl group, $R_8$ represents an H or a $C_1$–$C_{12}$ alkyl or a $C_5$–$C_{12}$ cycloalkyl or a $C_6$–$C_{12}$ aryl or a $C_8$–$C_{32}$ arylalkyl group, it being possible for $R_7$ and $R_8$ to be identical or different, the monomers B2 corresponding to the following general formula:

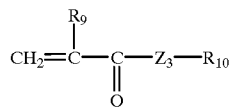

in which $R_9$=H or $CH_3$, $Z_3$ represents an O, $NH_3$ or $NR_{11}$ with $R_{11}$=$C_1$–$C_4$ alkyl, $R_{10}$ represents a $C_1$–$C_{32}$ alkyl, $C_5$–$C_{12}$ cycloalkyl, $C_6$–$C_{12}$ aryl or $C_8$–$C_{32}$ arylalkyl group, any other monomer B3 containing a polymerizable double bond, such as vinylidene chloride, vinylidene fluoride, vinyl chloride, butadiene, chloroprene, etc., c) from 0 to 30% of at least one amphiphilic monomer C which can be chosen from the group consisting of:

the monomers $C_1$ corresponding to one of the following general formulae:

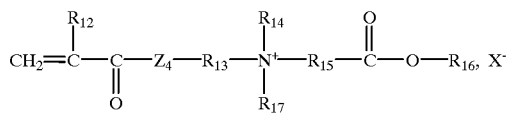

in which $Z_4$=O, NH or $NR_{21}$, $R_{21}$ being a $C_1$–$C_6$ alkyl or $C_5$–$C_{12}$ cycloalkyl group, $R_{12}$=H or a methyl, $R_{13}$, $R_{14}$, $R_{15}$ and $R_{17}$ independently represent a $C_1$–$C_6$ alkyl or hydroxyalkyl or a $C_5$–$C_{12}$ cycloalkyl, $R_{16}$ represents a $C_1$–$C_{32}$ alkyl or a $C_8$–$C_{32}$ aryl and/or arylalkyl, X is a halogen, pseudo halogen, $SO_4CH_3$, acetate, SNC, etc.,

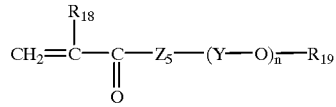

in which $R_{18}$=H or methyl, $Z_5$=O, NH or $NR_{20}$ with $R_{20}$=$C_1$–$C_6$ alkyl or hydroxyalkyl, Y=$C_1$–$C_6$ alkyl, n is an integer between 1 and 50, $R_{19}$=$C_1$–$C_{32}$ alkyl, $C_6$–$C_{32}$ aryl or $C_6$–$C_{32}$ arylalkyl, the molecules C2 corresponding to the general formula

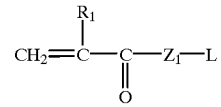

in which $R_1$=H or $CH_3$, $Z_1$=O, NH or $NR_2$ with $R_2$ being a $C_1$–$C_{16}$ alkyl or hydroxyalkyl group

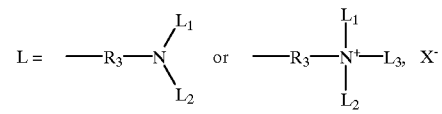

or $R_3$=$C_1$–$C_{18}$ alkylene or hydroxyalkylene and $L_1$, $L_2$ and $L_3$ independently represent an H or a $C_1$–$C_{18}$ alkyl or hydroxyalkyl, a $C_5$–$C_{18}$ cycloalkyl or a $C_7$–$C_{32}$ arylalkyl.

Typical examples of these dispersants are the copolymer based on styrene and on acryloxyethyl trimethylammonium chloride, denoted as ADAMQUAT MC, and polymers based on imidized, and then salified or quaternized, maleic anhydride, and containing:

from 15 to 90 mol %, and preferably from 20 to 60 mol %, of maleic anhydride, from 10 to 85 mol %, and preferably from 40 to 80 mol %, of at least one hydrophobic monomer which can be copolymerized with maleic anhydride.

The dispersant polymers according to the invention are prepared according to a batchwise or semi-continuous process by radical solution copolymerization in a solvent or a mixture of solvents with a low boiling point. The polymerization step is followed by distillation of the low-boiling solvent and addition of water in order to obtain a presentation of dispersant as an aqueous solution free of pollutant solvent. These solvents are generally ketones, alcohols and ether. Typical examples of solvents are acetone, methyl ethyl ketone and ethanol. The total monomer concentration can range from 5 to 75% by weight and preferably 20 to 50%. The polymerization is carried out in the presence of initiator (s) used in a proportion of from 0.1 to 4%, and preferably from 0.5 to 2%, relative to the total weight of the monomers employed. Peroxides such as benzoyl peroxide, lauryl peroxide, succinyl peroxide and tert-butyl perpivalate, or diazo compounds such as 2,2'-azobisisobutyronitrile, 2,2'-azobis(2,4-dimethylvaleronitrile) and azodicarbonamide can be used as initiators. The process can also be performed in the presence of UV radiation and photoinitiators such as benzophenone, 2-methylanthraquinone or 2-chlorothioxanthone. The polymer chain lengths can, if so desired, be adjusted using chain transfer agents such as alkyl mercaptans, carbon tetrachloride or triphenylmethane, used in a proportion of from 0.05 to 3% relative to the total weight of the monomers. The reaction temperature can vary within a wide range, i.e. from –40° C. to 200° C. Preferably, the process is performed between 50 and 95° C.

The dispersants based on maleic anhydride copolymers are obtained by imidization of the hydrophobic monomer/maleic anhydride copolymers with a diamine (for example dimethylaminopropylamine) according to the technique described in the literature. This copolymer is then salified with an acid or quaternized with an alkyl halide such as methyl or benzyl chloride (J. Applied Polymer Science 59, 599–608, 1996).

A second subject of the invention is aqueous dispersions of water-soluble polymers, which may or may not be crosslinked, obtained by polymerization, in the presence of the-dispersants mentioned above, of a monomer mixture containing:

from 70 to 100 mol % of at least one water-soluble monomer A,
from 0 to 30 mol % of at least one hydrophobic monomer B,
from 0 to 30 mol % of at least one amphiphilic monomer C,
from 0 to 5 mol % of at least one crosslinking agent chosen from the group containing:
monomers containing a methylol function, such as N-methylolacrylamide,
monomers containing at least two polymerizable unsaturations, such as N,N-methylenebisacrylamide or ethylene glycol dimethacrylate.

The monomer mixture represents from 10 to 40%, and preferably from 15 to 30%, by weight of the reaction mixture consisting of water, the dispersant and monomers, the dispersant representing from 1 to 30%, and preferably from 2 to 15%, by weight. The polymerization can be initiated by various means, for instance by free-radical generators such as peroxides, diazo compounds or persulphates, or by irradiation. The preferred method according to the invention is initiation with 2,2'-azobis(2-aminopropane) hydrochloride, denoted hereinbelow as ABAH. These initiators can be combined with a decomposition accelerator. The polymerization temperature is between 0 and 100° C. and preferably 40 and 95° C. The conversion is greater than 99%.

The dispersants or dispersions of water-soluble polymer obtained can be used for the following applications: flocculant, paper retention, agent for facilitating cleaning on various supports (for example textile), dispersion of charges, inhibitor for the transfer of pigments and dyes onto various supports (for example textile) and thickeners.

The examples which follow illustrate the invention without limiting it.

EXAMPLES

In all the examples below, the parts are given on a weight basis.

Example 1 a) Preparation of a Dispersant Copolymer 330 parts of ethanol, 150 parts of methyl ethyl ketone, 140 parts of styrene, 175 parts of aqueous 80% acryloxyethyl trimethylammonium chloride (QUAT MC) solution and 2 parts of n-dodecyl mercaptan are introduced with stirring into a 1-litre reactor.

The reactor is brought to 75° C. while flushing with nitrogen and 0.36 part of 2,2'-azobis(isobutyro-nitrile) (AIBN) and 0.72 part of 2,2'-azobis(2,4-dimethylvaleronitrile) are then introduced. The temperature is kept at 75° C. for 2 hours and 0.72 part of 2,2'-azobis (isobutyronitrile) (AIBN) and 0.72 part of 2,2'-azobis(2,4-dimethylvaleronitrile) are added. After reaction for 2 h 30, the distillation is started by gradually raising the jacket temperature from 78° C. to 99° C. After about 350 parts of solvent have been removed, 480 parts of water are added and the distillation is continued until all of the ethanol/methyl ethyl ketone mixture has been removed.

b) Preparation of the Polymer Dispersion Based on Styrene/QUAT MC Copolymer Dispersant This procedure applies to all the tests carried out with the styrene/QUAT MC copolymer dispersants.

173.4 parts of water and 156 parts of aqueous 33.4% solution of dispersant prepared above are introduced into a 1-litre reactor. The reactor is brought to 65° C. over 30 minutes while flushing with nitrogen. 89.5 parts of aqueous 80% acryloxyethyldimethylbenzylammonium chloride (QUAT BZ), 46.8 parts of acrylamide at 50% in water, 5 parts of butyl acrylate (BuA) and 0.01 part of ABAH diluted in 5 parts of water are then introduced. The temperature is maintained at 65° C. for 2 h. A further 0.1 part of ABAH diluted in 10 parts of water is then added and the temperature is raised to 80° C. After reaction for 1 and a half hours at 80° C., a further 0.025 part of initiator diluted in 5 parts of water is added. After 1 and a half hours, this last operation is repeated and the temperature is maintained for 1 hour. The mixture is then cooled to 30° C. and the reactor is emptied.

The viscosity of the dispersion thus obtained, composed of 20.2% dispersed polymer and 10.5% dispersant polymer, is 9800 cp at 25° C.

Examples 2,3,4,5 and 6

These are identical to Example 1 except that in the synthesis of the dispersant, the styrene/QUAT MC molar ratio is variable (3/1, 2.5/1, 2/1, 1.5/1 and 1/1). The levels of dispersed and dispersant polymer are also different and are summarized (see the table on page 16).

Example 7 c) Preparation of the dispersion of water-soluble polymer based on styrene/maleic anhydride copolymer dispersant imidized with dimethylaminopropylamine and salified (SMA+).

This procedure applies to all the tests carried out with the imidized and salified styrene/maleic anhydride copolymer dispersants (SMA+).

275.3 parts of water, 11.2 parts of acetic acid and 52 parts of imidized styrene/maleic anhydride (2/1 molar ratio) copolymer are introduced into a 1-litre reactor. The reactor is maintained at 65° C. for 30 minutes while flushing with nitrogen. 89.5 parts of aqueous 80% acryloxyethyldimethylbenzylammonium chloride (QUAT BZ) solution, 46.8 parts of acrylamide at 50% in water, 5 parts of butyl acrylate (BuA) and 0.01 part of ABAH diluted in 5 parts of water are then introduced. The temperature is maintained at 65° C. for 2 hours. A further 0.1 part of ABAH diluted in 10 parts of water are then added and the temperature is raised to 80° C. After reaction for 1 and a half hours at 80° C., a further 0.025 part of initiator diluted in 5 parts of water is added. After 1 and a half hours, this last operation is repeated and the temperature is maintained for 1 hour. The reactor is then cooled to 30° C. and emptied.

Examples 8 and 9

These are identical to Example 7 except that the composition of the imidized styrene/maleic anhydride copolymer dispersant has changed, going from a styrene/maleic anhydride molar ratio of from 2/1 to 1/1 and then 3/1.

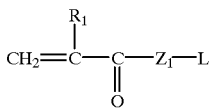

in which $R_1$=H or $CH_3$, $Z_1$=O, NH or $NR_2$ with $R_2$ being $C_1$–$C_6$ alkyl or hydroxyalkyl group

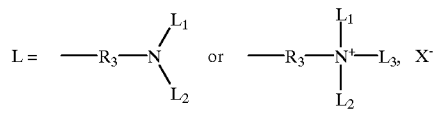

where $R_3$=$C_1$–$C_6$ alkylene or hydroxyalkylene; $L_1$, $L_2$ and $L_3$ independently represent an H, a $C_1$–$C_6$ alkyl or hydroxyalkyl, a $C_5$–$C_{12}$ cycloalkyl, a $C_6$–$C_{12}$ aryl or alkylaryl; and X is a monovalent ion;

| Example | 1 | 2 | 3 | 4 | 5 |
|---|---|---|---|---|---|
| % dispersed polymer | 20.2 | 20 | 20 | 20 | 20 |
| Composition | Acry/QUATBZ/BuA | Acry/QUATBZ/BuA | Acry/QUATBZ/BuA | Acry/QUATBZ/BuA | Acry/QUATBZ/BuA |
| % by mass | 23.4/71.6/5 | 23.4/71.6/5 | 23.4/71.6/5 | 23.4/71.6/5 | 23.4/71.6/5 |
| % dispersant | 10.5 | 12 | 12 | 6 | 12 |
| Composition | Styrene/QUATMC | Styrene/QUATMC | Styrene/QUATMC | Styrene/QUATMC | Styrene/QUATMC |
| Molar ratio | 1.87/1 | 2.5/1 | 2.0/1 | 1.87/1 | 1.50/1 |
| Solids content | 30.7 | 32 | 32 | 26 | 32 |
| Appearance of the product | Opaque emulsion | Opaque emulsion | Opaque emulsion | Opaque emulsion | Opaque emulsion |
| Viscosity (cp) | 9800 | 11,000 | 5800 | 6125 | 8000 |

| Example | 6 | 7 | 8 | 9 |
|---|---|---|---|---|
| % dispersed polymer | 20 | 20 | 20 | 20 |
| Composition | Acry/QUATBZ/BuA | Acry/QUATBZ/BuA | Acry/QUATBZ/BuA | Acry/QUATBZ/BuA |
| % by mass | 23.4/71.6/5 | 23.4/71.6/5 | 23.4/71.6/5 | 23.4/71.6/5 |
| % dispersant | 12 | 12 | 12 | 12 |
| Composition | Styrene/QUATMC | Styrene/MA (SMA+) | Styrene/MA (SMA+) | Styrene/MA (SMA+) |
| Molar ratio | 3/1 | 2/1 | 1/1 | 3/1 |
| Solids content | 32 | 32 | 32 | 32 |
| Appearance of the product | Opaque emulsion | Opaque emulsion | Opaque emulsion | Opaque emulsion |
| Viscosity (cp) | 96,000 | 5600 | 1200 | >400,000 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Dispersant for an aqueous dispersion of a water-soluble polymer, said dispersant comprising:

(a) from 15 to 99 mol % of units derived by polymerization of at least one water-soluble monomer A selected from the group consisting of
  (i) the monomers containing amine or quaternary ammonium functions and corresponding to the formula:
  (ii) the monomers containing carboxylic acid functions; and
  (iii) $C_1$–$C_6$ (meth)acrylamides, N-alkylacrylanides and N,N'-dialkyl (meth)acrylamides;

(b) from 1 to 85 mol % of units derived by polymerization of at least one hydrophobic monomer B selected from the group consisting of (i) ethylenic, vinyl and $C_1$–$C_{32}$ alkyl (meth)acrylate monomers and diene monomers, and (ii) fluoro monomers; and (c) from 0 to 30 mol % of residues of at least one amphiphilic monomer C;

wherein said water-soluble polymer has a monomeric composition different from that of said dispersant.

2. Aqueous dispersion of a water-soluble polymer comprising 1 to 30% by weight of a dispersant, 10 to 40% by weight of a water-soluble polymer and water, said aqueous dispersion comprising:

(A) said dispersant comprising:
  (a-1) from 15 to 99 mol % of units derived by polymerization of at least one water-soluble monomer A selected from the group consisting of
    (i) the monomers containing amine or quaternary ammonium functions and corresponding to the formula:

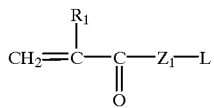

in which
  $R_1$=H or $CH_3$,
  $Z_1$=O, NH or $NR_2$ with $R_2$ being $C_1$–$C_6$ alkyl or hydroxyalkyl group

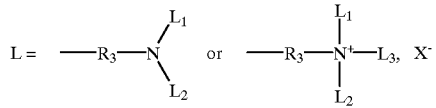

where $R_3$=$C_1$–$C_6$ alkylene or hydroxyalkylene;
$L_1$, $L_2$ and $L_3$ independently represent an H, a $C_1$–$C_6$ alkyl or hydroxyalkyl, a $C_5$–$C_{12}$ cycloalkyl, a $C_6$–$C_{12}$ aryl or alkylaryl; and X is a monovalent ion;
    (ii) the monomers containing carboxylic acid functions; and
    (iii) $C_1$–$C_6$ (meth)acrylamides, N-alkylacrylamides and N,N'-dialkyl (meth)acrylamides;
  (a-2) from 1 to 85 mol % of units derived by polymerization of at least one hydrophobic monomer B selected from the group consisting of (i) ethylenic, vinyl and $C_1$–$C_{32}$ alkyl (meth)acrylate monomers and diene monomers, and (ii) fluoro monomers; and
  (a-3) from 0 to 30 mol % of residues of at least one amphiphilic monomer C; and
    (B) said water-soluble polymer comprising:
  (b-1) from 70 to 100 mol % of residues of at least one of said monomer A,
  (b-2) from 0 to 30 mol % of residues of at least one of said monomer B,
  (b-3) from 0 to 30 mol % of residues of at least one of said monomer C, and
  (b-4) from 0 to 5 mol % of residues of at least one of monomer D selected from the group consisting of crosslinking monomers containing at least one methylol function or at least two unsaturations;
wherein said water-soluble polymer has monomeric composition different form that of said dispersant.

3. Dispersant according to claim 1, wherein it contains:
  a) from 20 to 80 mol % of residues of at least one water-soluble monomer A, and
  b) from 20 to 80 mol % of residues of at least one hydrophobic monomer B.

4. Dispersant according to claim 1, wherein the monomer A is acryloxyethyldimethylbenzylammonium chloride or acryloxyethyltrimethylammonium chloride.

5. Dispersant according to claim 1, wherein the monomer B is styrene, butyl acrylate or stearyl methacrylate.

6. Dispersion according to claim 2, wherein the crosslinking monomer is N-methylolacrylamide or N,N-methylenebisacrylamide.

7. Dispersant according to claim 1, wherein the monovalent ion is Cl or SNC, the carboxylic acid is methacrylic acid, acrylic acid or salts thereof, and the fluoro monomers are vinylidene chloride or vinylidene fluoride.

8. Dispersion according to claim 2, wherein the amount of dispersant is from 2 to 15%.

9. Dispersion according to claim 2, wherein the amount of water-soluble polymer is from 15 to 30%.

* * * * *